Patented Feb. 19, 1946

2,395,378

UNITED STATES PATENT OFFICE 2,395,378

AQUEOUS SOLUTION OF RIBOFLAVIN

Henry C. Miller, Indianapolis, Ind., assignor to Eli Lilly and Company, Indianapolis, Ind., a corporation of Indiana No Drawing. Application May 15, 1942,
Serial No. 443,171

5 Claims. (Cl. 167—81)

This invention relates to water solutions of vitamins.

Parenteral administration of 9-polyhydroxyalkyl-isoalloxazines, such as riboflavin (9-d-ribityl-6,7-dimethyl-isoalloxazine), may often be required in the treatment of certain vitamin deficiencies. For example, in the case of riboflavin, good medical technique dictates that the volume of the solution employed desirably be as small as possible to supply the patient with the necessary amount of riboflavin. The solubility of riboflavin in water has been reported as 12 mg. per 100 cc. of water at 81.5° F., or 0.012 percent. Since therapeutic doses of riboflavin that have been used range from 5 to 30 mg., the administration of approximately 40 to 250 cc. of solution has heretofore been required to supply these necessary doses. The administration of these relatively large volumes of solution is particularly disadvantageous when the solution is to be administered intramuscularly. To be sure, a large volume can be given intramuscularly, but the consequential separation of the muscle fibres may produce definite discomfort to the patient and sometimes irreparable harm to the tissues. Then, too, the desire to reduce the volume by increasing the concentration of riboflavin in a water solution frequently results in a supersaturated or saturated solution and, due to evaporation or agitation of the solution, some of the riboflavin is precipitated. Particles of the precipitated riboflavin in a solution could be dangerous when such solutions are administered intravenously. In some cases obstruction of the small capillary vessels by these particles might occur, causing an infarct or infarcts. Accordingly, both the intravenous and intramuscular administration of solutions of riboflavin have been made somewhat difficult by the relatively low solubility of riboflavin in water.

In accordance with this invention, a stable aqueous solution of a 9-polyhydroxyalkyl-isoalloxazine, such as riboflavin, whether derived from natural sources or prepared synthetically, is obtained which contains a concentration of the 9-polyhydroxyalkyl-isoalloxazine markedly greater than that obtained by dissolving the 9-polyhydroxyalkyl-isoalloxazine in pure water. The solutions of 9-polyhydroxyalkyl-isoalloxazines, such as riboflavin, in accordance with this invention, may also contain other vitamins, such as the other members of the vitamin B complex, without in any way resulting in a diminution of the therapeutic effectiveness of the riboflavin or the other vitamins present in such solution.

The solutions of this invention are prepared by adding a solubilizing agent prior to the addition of the 9-polyhydroxyalkyl-isoalloxazine to the solution. The solubilizing agents of this invention are water-soluble salts of benzoic acid and substituted benzoic acids in which the substituents are amino or hydroxyl groups. These solubilizing agents exert a definite solubilizing effect on a 9-polyhydroxyalkyl-isoalloxazine. The solution may be heated until the 9-polyhydroxyalkyl-isoalloxazine is dissolved and, if the solution is so heated, the heating is preferably performed in a refluxing apparatus to prevent evaporation of the solvent. The amount of solubilizing agent required depends upon the concentration of the 9-polyhydroxyalkyl-isoalloxazine desired. If the solubilizing agent be sodium salicylate and the 9-polyhydroxyalkyl-isoalloxazine be riboflavin, with a concentration of 1 mg. of riboflavin per cc., or 0.1 percent, between 12 and 15 mg. of sodium salicylate per cc. are required; with 2 mg. of riboflavin per cc., or 0.2 percent, about 25 mg. of sodium salicylate are required; and with 120 mg. of riboflavin per cc., or 12.0 percent, about 625 mg. of sodium salicylate are required. This high concentration of 120 mg. of riboflavin per cc. which may be effected by this invention, is approximately three times as great as the maximum concentration obtainable when nicotinamide is employed as the solubilizing agent for riboflavin. Moreover, by the practice of this invention, over 900 times the amount of riboflavin can be dissolved than with the use of pure water. It is sometimes advantageous to add more than the minimum amount of the solubilizing agent required to keep the 9-polyhydroxyalkyl-isoalloxazines in solution since, with saturated solutions precipitation of the 9-polyhydroxyalkyl-isoalloxazine may result on standing. If desired, a solution of a plurality of 9-polyhydroxyalkyl-isoalloxazines may be prepared by the use of one or more solubilizing agents of this invention. Likewise, a plurality of solubilizing agents of this invention may be used to effect solution of one 9-polyhydroxyalkyl-isoalloxazine.

The minimum amount of the solubilizing agent required for producing a 9-polyhydroxyalkyl-isoalloxazine solution of definite concentration can readily be determined empirically. For example, if the 9-polyhydroxyalkyl-isoalloxazine be riboflavin, this amount may be ascertained by placing varying quantities of the solubilizing agent in different test tubes containing the same volume of water, heating the solution, and then adding the amount of riboflavin desired to each of the solutions. The solutions are then cooled to the temperature, ordinarily room temperature, at which the desired riboflavin solution is to be used or stored. The solution containing the minimum amount of the solubilizing agent in which no precipitation of riboflavin is discernible indicates the minimum amount of the solubilizing agent necessary to maintain the desired quantity of riboflavin in solution. The solubility of riboflavin in water, both with and without the solubilizing agent, varies with temperature. For example, it has been found that as much as 30 mg. of riboflavin per 100 cc. can be dissolved in water and maintained at a relatively high temperature. However, the riboflavin precipitates on cooling. Consequently, it is important that the observation of possible precipitation of the riboflavin be performed at a temperature at which the solution is likely to be stored and used. A temperature range between 60° and 80° F. is ordinarily satisfactory. It is sometimes advantageous, of course, that a quantity sufficiently greater than the minimum amount of the solubilizing agent be added to insure against precipitation of the riboflavin resulting from low temperatures or other causes.

The riboflavin, sometimes called lactoflavin, vitamin $B_2$, vitamin G, ovoflavin, and hepatoflavin, may be derived from natural sources or prepared synthetically. If derived from a natural source, the entire B complex or parts thereof obtained from the natural sources may be added to water and sufficient solubilizing agent added to effect complete solution of the riboflavin contained in the complex in a relatively small volume of water. Preferably, however, the riboflavin used in solutions of this invention is produced synthetically. The solutions of this invention may contain any other constituent which is useful in effecting a desired end.

Examples of 9-polyhydroxyalkyl-isoalloxazines other than riboflavin are:

9-(1,1'-arabityl)-6,7-dimethyl-isoalloxazine
9-(d,1'-ribityl)-7-monomethyl-isoalloxazine
9-(d,1'-ribityl)-6-monomethyl-isoalloxazine
9-(d,1'-ribityl)-6-ethyl-7-methyl-isoalloxazine The following examples of the solubilizing agents, which examples may be referred to as "alkali" salts, are: The alkali metal salts, such as the sodium, potassium, and lithium salts, the alkaline-earth metal salts, such as calcium and magnesium salts, and the ammonium and substituted ammonium salts, such as the ethanolamine salt, of benzoic acid, salicylic acid, m-hydroxybenzoic acid, p-hydroxybenzoic acid, o-aminobenzoic acid, m-aminobenzoic acid, and p-aminobenzoic acid.

Typical examples of the solutions of this invention are as follows:

*Example 1.*—Solution utilizing sodium salicylate as solubilizing agent.

An aqueous solution of sodium salicylate containing 625 mg. per cc. maintains in solution 120 mg. of riboflavin per cc. at temperatures between 65° and 75° F. This solution is prepared by dissolving 62.5 g. of sodium salicylate in 62.5 cc. of water. This is substantially a saturated solution of sodium salicylate. The volume of this resulting solution is approximately 100 cc. To the substantially saturated solution of sodium salicylate having a volume of 100 cc. is added 12 g. of riboflavin. It is agitated until solution of the riboflavin is effected. Such solution, containing approximately 625 mg. per cc. of sodium salicylate and approximately 120 mg. per cc. of riboflavin, has a pH of approximately 6.7, which is favorable for the preservation of the riboflavin. Biological tests indicate that there is no diminution of the therapeutic efficacy of the riboflavin in solutions of this invention.

The constituents of vitamin B complex may be included in the solutions of this invention. For example, a solution may be prepared by dissolving at least 3 g. of sodium salicylate in 5 cc. of water. After solution is completed, at least 0.2 g. of riboflavin are added to the solution and the mixture agitated until the riboflavin is dissolved, to make a solution of 4.0 percent riboflavin concentration. The solution is then diluted to approximately 80.0 cc. with distilled water and 0.5 g. of crystalline vitamin $B_1$ hydrochloride (thiamin chloride hydrochloride), 0.2 g. of vitamin $B_6$ hydrochloride (pyridoxine hydrochloride), 5.0 g. of nicotinamide, and 0.2 g. of calcium pantothenate are added to the solution. After these materials are dissolved, the solution is diluted to 100 cc. with distilled water. If the resulting solution is required for parenteral use, it is preferably sterilized. The solution has the following composition:

|  | Mg. per cc. |
|---|---|
| Vitamin $B_1$ | 5 |
| Riboflavin | 2 |
| Vitamin $B_6$ | 2 |
| Calcium pantothenate | 2 |
| Nicotinamide | 50 |
| Sodium salicylate | 30 |

By this means, a solution of vitamin B complex of relatively small volume is obtained containing all the definitely known elements of the complex in amounts believed to represent the average daily requirements of each vitamin for an adult.

*Example 2.*—Solution utilizing magnesium salicylate as solubilizing agent.

A solution containing riboflavin and magnesium salicylate is prepared in a manner similar to that described in Example 1 by dissolving 5.0 g. of magnesium salicylate in 25 cc. of distilled water. To this solution is added 0.4 g. of riboflavin and the mixture is agitated until solution of the riboflavin is effected. The resulting solution is then diluted to 100 cc. with distilled water.

*Example 3.*—Solution utilizing ammonium salicylate as solubilizing agent.

A solution containing riboflavin and ammonium salicylate is prepared by dissolving 5.0 g. of ammonium salicylate in 80 cc. of distilled water. To this solution is added 0.2 g. of riboflavin and the solution is heated in a refluxing apparatus until solution of the riboflavin is effected. The resulting solution is then diluted to 100 cc. with distilled water.

*Example 4.*—Solution utilizing sodium benzoate as solubilizing agent.

A solution containing riboflavin and sodium benzoate is prepared by dissolving 10 g. of sodium benzoate in 80 cc. of distilled water. To this solution is added 0.2 g. of riboflavin and the solution is heated in a refluxing apparatus until solution of the riboflavin is effected. The resulting solution is then diluted to 100 cc. with distilled water.

*Example 5.*—Solution utilizing lithium benzoate as solubilizing agent.

A solution containing riboflavin and lithium benzoate is prepared by dissolving 10 g. of lithium benzoate in 25 cc. of distilled water. To this solution is added 0.3 g. of riboflavin and the mixture is agitated until solution is effected. The resulting solution is then diluted to 100 cc. with distilled water.

*Example 6.*—Solution utilizing sodium p-hydroxy-benzoate.

A solution containing riboflavin and sodium p-hydroxybenzoate is prepared by dissolving 5 g. of sodium p-hydroxybenzoate in 80 cc. of distilled water. To this solution is added 0.2 g. of riboflavin and the solution is heated in a refluxing apparatus until solution of the riboflavin is effected. The resulting solution is then diluted to 100 cc. with distilled water.

*Example 7.*—Solution utilizing sodium p-aminobenzoate as solubilizing agent.

A solution containing riboflavin and sodium p-aminobenzoate is prepared by dissolving 30 g. of sodium p-aminobenzoate in 70 cc. of distilled water. To this solution is added 1.0 g. of riboflavin and the mixture is agitated until solution is effected. The resulting solution is then diluted to 100 cc. with distilled water.

*Example 8.*—Solution utilizing monoethanolamine salicylate as solubilizing agent.

A solution containing riboflavin and monoethanolamine salicylate is prepared by dissolving 72.0 g. of monoethanolamine salicylate in 50 cc. of distilled water. To this solution is added 5.0 g. of riboflavin and the mixture is agitated until solution is effected. The resulting solution is then diluted to 100 cc. with distilled water.

Solution of other 9-polyhydroxyalkyl-isoalloxazines may be prepared in the manner described in Examples 1 to 8 except that the other 9-polyhydroxyalkyl-isoalloxazines are substituted for the riboflavin in these examples. For example, dihydroriboflavin may be substituted for the riboflavin in any of the specific examples.

The solutions defined in the appended claims may contain other vitamins, such as vitamin $B_1$ (thiamin chloride), or any other material which is useful for the purpose for which these solutions are prepared.

What is claimed is:

1. An aqueous composition comprising 9-polyhydroxyalkyl-isoalloxazine dissolved in water, and a water-soluble salt selected from the group consisting of alkali metal, alkaline-earth metal and ammonium and substituted ammonium salts of benzoic acid, mono-aminobenzoic acid and mono-hydroxy-benzoic acid, said 9-polyhydroxyalkyl-isoalloxazine being present in amount greater than that soluble by itself in the water, and said salt being present in amount effective to maintain said 9-polyhydroxyalkyl-isoalloxazine in solution.

2. An aqueous composition comprising riboflavin dissolved in water, and a water-soluble salt selected from the group consisting of alkali metal, alkaline-earth metal and ammonium and substituted ammonium salts of benzoic acid, mono-hydroxy-benzoic acid and mono-aminobenzoic acid, said composition containing riboflavin in amount greater than that soluble by itself in the water and greater than 0.012 percent, and said salt in amount effective to maintain said riboflavin in solution.

3. An aqueous composition comprising riboflavin dissolved in water, and sodium p-aminobenzoate, said composition containing riboflavin in amount greater than that soluble by itself in the water and greater than 0.012 percent, and sodium p-aminobenzoate in amount effective to maintain said riboflavin in solution.

4. An aqueous composition comprising riboflavin dissolved in water, and monoethanolamine p-aminobenzoate, said composition containing riboflavin in amount greater than that soluble by itself in the water and greater than 0.012 percent, and monoethanolamine p-aminobenzoate in amount effective to maintain said riboflavin in solution.

5. An aqueous composition comprising riboflavin dissolved in water, and sodium salicylate, said composition containing from about 1 to 120 milligrams of riboflavin per cubic centimeter of solution and from about 12 to 625 milligrams of sodium salicylate per cubic centimeter of solution.

HENRY C. MILLER.